United States Patent [19]

Hill

[11] Patent Number: 5,569,836
[45] Date of Patent: Oct. 29, 1996

[54] SUSPENSION TESTING APPARATUS AND METHOD

[75] Inventor: Raymond L. Hill, Attleborough, United Kingdom

[73] Assignee: Lotus Cars Limited, Norfolk, England

[21] Appl. No.: 244,971

[22] PCT Filed: Feb. 19, 1993

[86] PCT No.: PCT/GB93/00352

§ 371 Date: Nov. 4, 1994

§ 102(e) Date: Nov. 4, 1994

[87] PCT Pub. No.: WO93/17319

PCT Pub. Date: Sep. 2, 1993

[30] Foreign Application Priority Data

Feb. 19, 1992 [GB] United Kingdom ............ 9203651

[51] Int. Cl.⁶ ........................................ G01M 17/00
[52] U.S. Cl. ................................ 73/11.07; 73/117
[58] Field of Search ............... 33/203.14, 203.15; 73/11.04, 11.08, 11.07, 117, 11.09, 121, 122, 123, 124

[56] References Cited

U.S. PATENT DOCUMENTS

| | | | |
|---|---|---|---|
| 2,923,147 | 2/1960 | MacMillan | 73/11.08 |
| 3,023,511 | 3/1962 | Castiglia | 33/203.15 |
| 3,030,796 | 4/1962 | MacMillan | 73/11.08 |
| 3,823,485 | 7/1974 | Lambrecht | 33/203.14 |
| 3,937,058 | 2/1976 | Hillbrands | 73/11 |
| 4,192,074 | 3/1980 | Chang | 33/203.15 |
| 4,429,467 | 2/1984 | Murata et al. | 33/203.15 |
| 4,457,075 | 7/1984 | Murata | 33/203.15 |
| 4,589,273 | 5/1986 | Tamasi et al. | 73/11.08 |
| 4,863,266 | 9/1989 | Masuko et al. | 33/203.16 |
| 5,056,024 | 10/1991 | Stuyts | 73/11.08 |
| 5,369,974 | 12/1994 | Tsymberov | 73/11.08 |

FOREIGN PATENT DOCUMENTS

| | | | |
|---|---|---|---|
| 0011100A1 | 5/1980 | European Pat. Off. | G01M 17/06 |
| 2653109-A1 | 4/1991 | France | B66F 7/08 |
| 2851719A1 | 6/1980 | Germany | G01M 17/04 |
| 3432781A1 | 3/1986 | Germany | G01B 21/24 |
| 1144342 | 3/1969 | United Kingdom | B06B 1/00 |

Primary Examiner—Richard Chilcot
Assistant Examiner—Ronald Biegel
Attorney, Agent, or Firm—Fulwider Patton Lee & Utecht

[57] ABSTRACT

In one aspect, the suspension testing apparatus uses air bearings (96) which have a low coefficient of friction. In a second aspect, the suspension testing apparatus ensures accurate measurement of suspension characteristics since the apparatus applies forces directly below the center of the vehicle wheel hub (12) (or forwardly or rearwardly therefrom at a distance equivalent to the pneumatic trail of the tire in the wheel (12)) to ensure that the point of application of force remains constant despite rotation of the support means (10) for the wheel (12) during deflection of the vehicle wheel (12). In a third aspect, the suspension testing apparatus provides new sensor means (22) for measuring the vehicle wheel deflection which uses a minimum number of transducers (162, 163, 164) to accurately monitor tire and wheel deflection during use. In a fourth aspect, the suspension testing apparatus uses mechanical actuators (15, 23) rather than hydraulic actuators to cause motion of the support means, which give an indication of the displacement of the support means. In a sixth aspect the suspension testing apparatus provides a method of testing a vehicle suspension using the suspension testing apparatus.

30 Claims, 12 Drawing Sheets

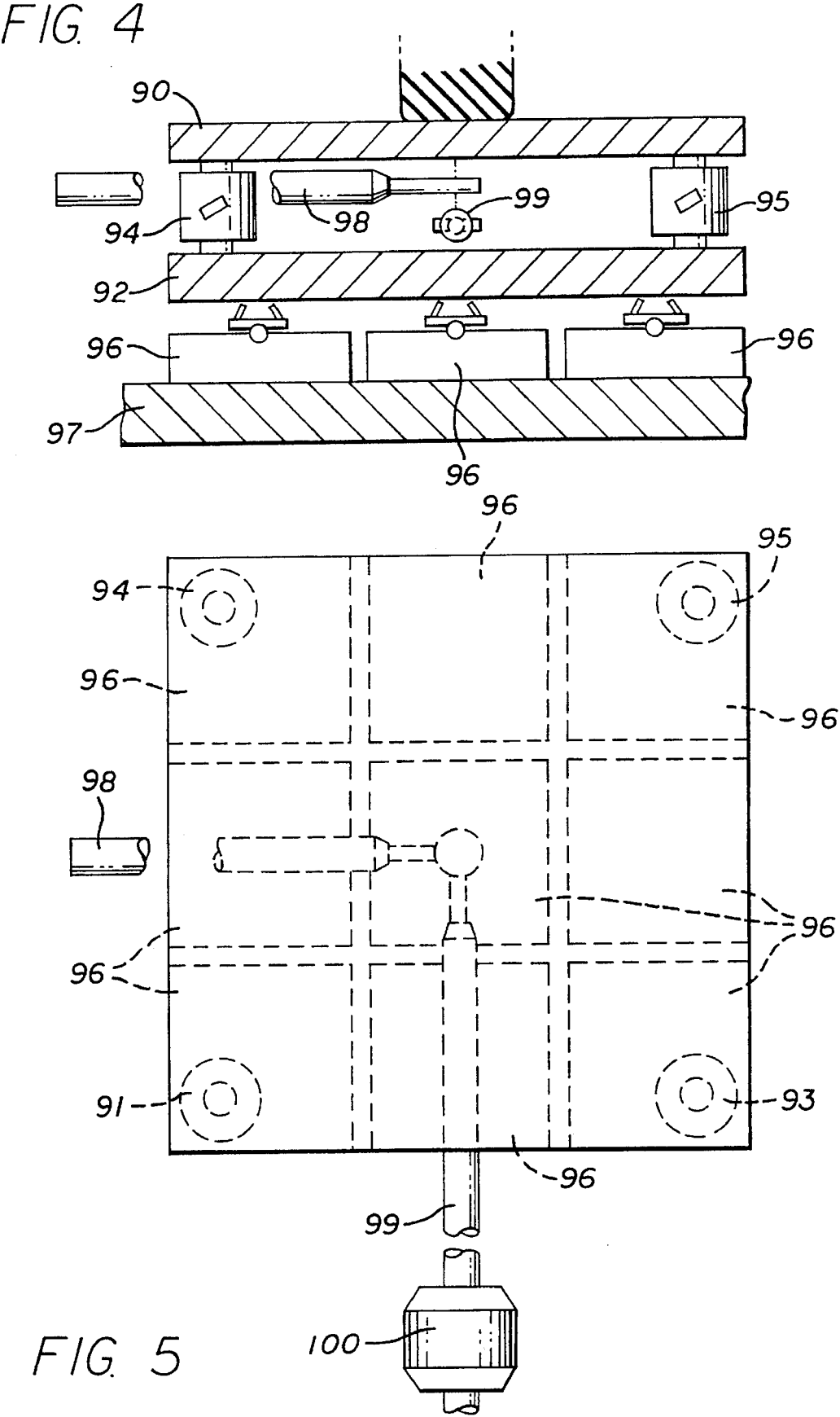

SUSPENSION TESTING APPARATUS AND METHOD

The present invention relates to apparatus for testing vehicle suspensions and a method of doing so.

It is important to all vehicle manufacturers to know how the suspension arrangements of their vehicles react under the forces experienced during driving, for instance forces arising during braking and acceleration and also transverse loading during cornering.

Vehicle manufacturers are also keen to ascertain how the wheel is inclined relative to the vehicle body during movement of the vehicle suspension under loading.

The present invention provides vehicle suspension testing apparatus comprising: support means for supporting thereon a vehicle wheel or a vehicle wheel hub, actuator means for applying a force to or for displacing the wheel support means, and sensor means for measuring the force on and/or displacement of the vehicle wheel or the vehicle wheel hub, wherein the wheel support means comprises air bearing means which in use raises the support means above the surface therebelow.

It has been found that the use of air bearing means is very signficant, since it is essential to allow the support means to move as freely as possible under loading of the actuators without resistance to motion. If mechanical bearings are used then these tend to oppose n some degree the motion of the support means and this can lead to inaccuracies in the measurements taken by the sensor means. This is of particular importance if the vehicle being tested is a large commercial vehicle, when large frictional forces can arise.

Preferably the support means has a flat lower exterior surface and the air bearing means comprises a plurality of individual air bearings each attached to the flat lower exterior surface of the support means fly attachment means which allows limited motion of the air bearings relative to the support means and which comprises resilient means acting between the said lowermost surface of the support means and the air bearings.

The provision of the attachment means as mentioned above is important since it allows the alignment of the support means relative to its supporting surface to ensure adequate lift at all parts of the support means and to enable even load distribution across the support means.

The present invention also provides vehicle suspension testing apparatus comprising: support means for supporting thereon a vehicle wheel or a vehicle wheel hub, actuator means for applying a force to or for displacing the wheel support means, and sensor means for measuring the forces on and or displacement of the vehicle wheel or the vehicle hub, wherein the actuator means is connected to the wheel support means by connection means either directly below the centre of the wheel hub or at a distance forwardly or rearwardly therefrom corresponding to the pneumatic trail or the tyre on the vehicle wheel, said connection means allowing free pivotal motion of the wheel support means.

It is important to ensure that the forces applied by the actuators remain applied to a desired point so that during rotation of the tyre during loading the point of loading does not alter such that a rotational moment is applied to the support means which could lead to erroneous measurements or complicated calculations in obtaining correct measurements.

Preferably the support means comprises a wheel plate far receiving thereon a vehicle wheel and the connection means is connected to the support means directly underneath the centre of the wheel plate.

The present invention also provides vehicle suspension testing apparatus comprising: support means for supporting thereon a vehicle wheel or a vehicle wheel hub, actuator means for applying a force to or for displacing the wheel support means, and sensor means for measuring the forces on and/or displacement of the vehicle wheel or the vehicle wheel hub, wherein the sensor means comprises a frame fixed relative to the wheel or wheel hub, and a wishbone arrangement extending between the frame and a wheel clamp member for attachment to the vehicle wheel or wheel hub, rotation sensors being provided to measure the pivoting of the wishbone members relative to the frame and inclinometers being provided on the wheel clamp member to measure its inclination.

The present invention further provides vehicle suspension testing apparatus comprising: support means for supporting thereon a vehicle wheel or a vehicle wheel hub, actuator means for applying a force to and/or tar displacing the wheel support means and sensor means for measuring the forces on and/or displacement of the vehicle wheel or the vehicle wheel hub, wherein the actuator means comprises a first mechanical actuator for moving the support means in a direction longitudinally along the vehicle and a second mechanical actuator for moving the support means transversely of the vehicle, which first and second mechanical actuators are respectively adapted to provide indications of the longitudinal and transverse displacement of the support means.

Mechanical actuators are advantageously used in preference to hydraulic actuators for several reasons. First, mechanical actuators tend to be very accurate and precise actuators of low cost. Equivalent hydraulic actuators are very expensive and precise displacement of the support means can only be achieved using complicating control and valving systems.

The mechanical actuators of the invention also provide an indication of the displacement of the support means, whereas electrical measurement apparatus will typically have to be used with hydraulic actuators to determine displacement of the support means.

Preferably the actuator means comprises additionally a third mechanical actuator for moving the support means vertically, which mechanical actuator is adapted to provide an indication of the vertical displacement of the support means.

It is far safer to use a mechanical actuator to provide vertical displacement than a hydraulic actuator. On failure of the means powering the mechanical actuator the mechanical actuator will remain in its extended position, whilst most forms of hydraulic actuator will not be locked in position. This is an important consideration when a heavy vehicle is being supported by the actuator, since use of hydraulic actuators can be very hazardous if on failure they do not support the weight of the vehicle and the support means is allowed to move under the weight of the vehicle.

In the preferred embodiments of the invention the mechanical actuators are ball and screw type actuators. These actuators provide a cheap, simple precise and efficient means of actuation.

Preferably the ball and screw type actuators of the invention are coupled to electric motors which cause the actuators to move the support means. As mentioned above, the arrangement is inherently safe since a ball and screw actuator will not move under the weight of the vehicle if the electric motor powering it fails.

Preferably the vehicle suspension testing apparatus of the invention additionally comprises a frame on which are mounted the support means and the actuator means, said actuator means acting between the frame and the support means, said frame having clamping means for securing the frame to the body of the vehicle being tested.

Preferably the actuator means can apply a force on the wheel or wheel hub longitudinally and transversely at the vehicle.

Preferably the actuator means can also apply vertical forces on the wheel or wheel hub.

Preferably the support means comprises a wheel plate for receiving thereon a vehicle wheel and a bearing mounting plate located parallel to and vertically spaced below the wheel plate to which air bearings are attached, the actuator means extending between the wheel plate and the bearing mounting plate to attachment means which attaches the actuator means to the wheel plate and the bearing mounting plate respectively below and above the centres of the plates, the attachment means allowing pivotal motion of the plates whilst restraining translational motion.

The invention further provides a method of testing a vehicle suspension system including the steps of:

locating a wheel or wheel hub of a vehicle on the support means of vehicle suspension testing apparatus as claimed in any one of the preceding claims, attaching the sensor means to the vehicle wheel or wheel hub, applying a force to or displacing the support means using the actuator means, measuring the displacement of the wheel or wheel hub using the sensor means.

The present invention will now be described with reference to the accompanying drawings in which;

FIG. 4 shows in cross-section a detail of part of a preferred embodiment of the invention, showing the construction of the support means of the embodiment.

FIG. 5 shows a plan view of the support means shown in crosssection in FIG. 4

Figure 3:
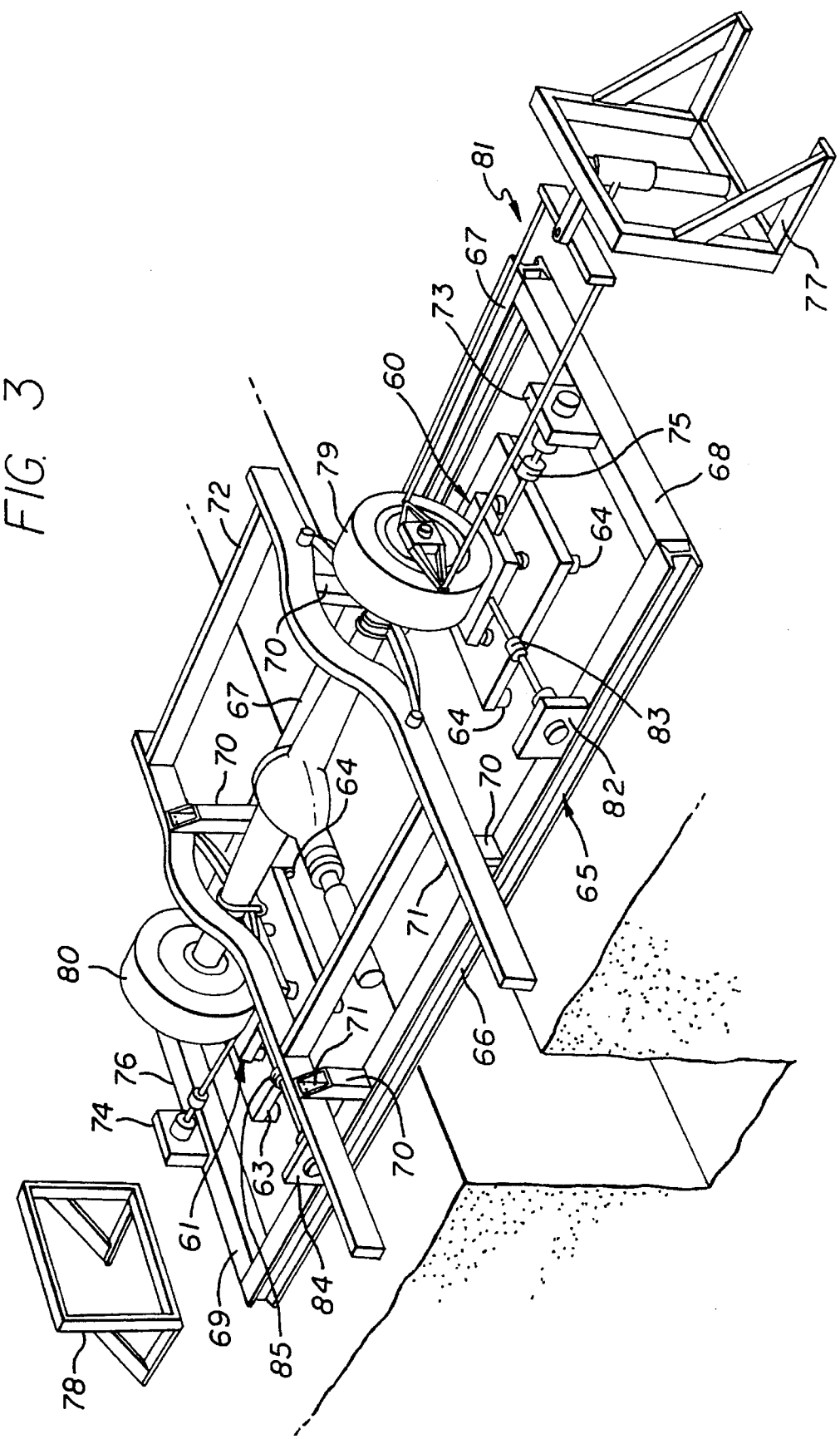
FIG. 3 shows a third embodiment of the testing apparatus of the invention
Figure 10:
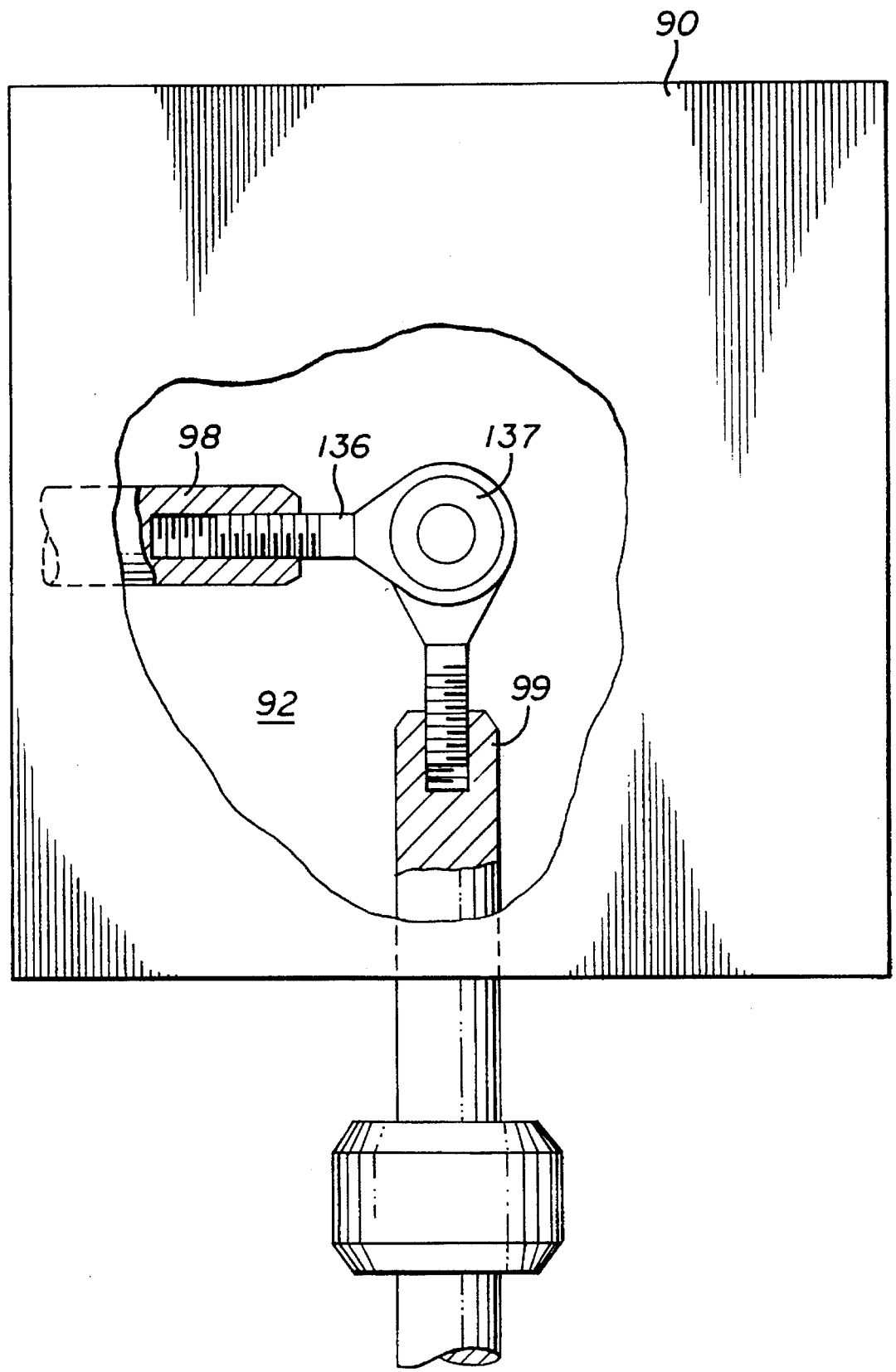
Figure 11:
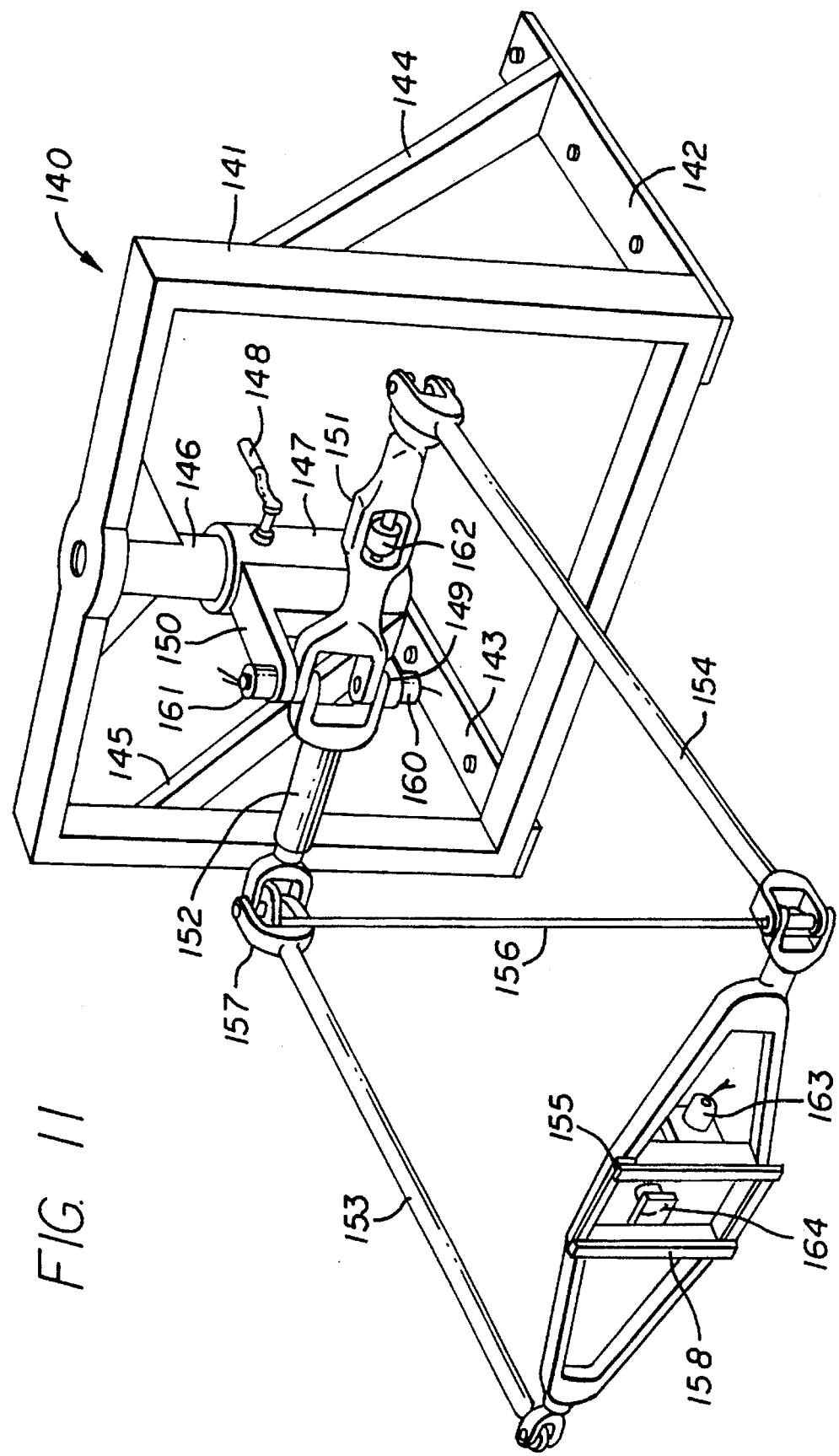
Figure 12:
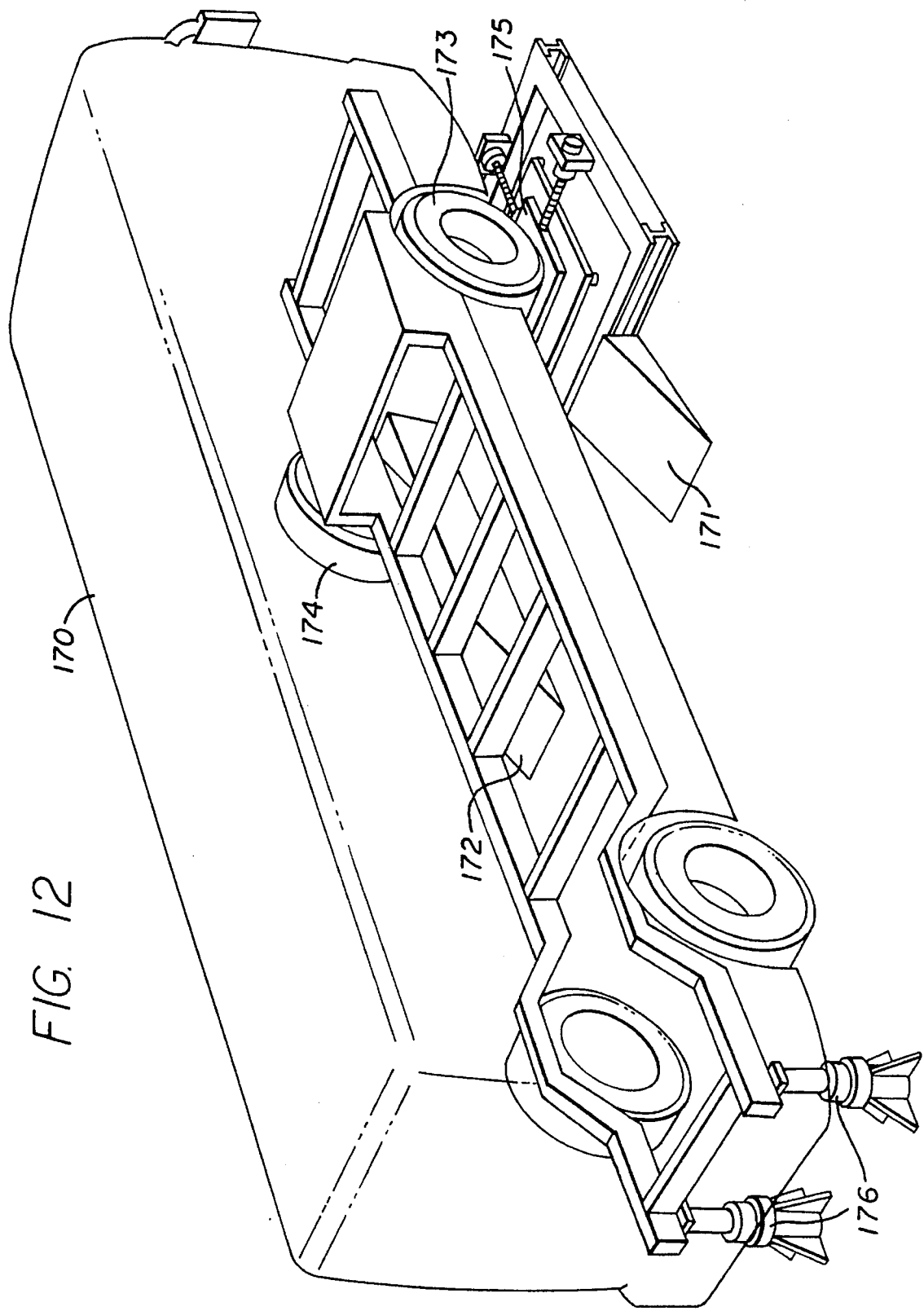
Figure 13:
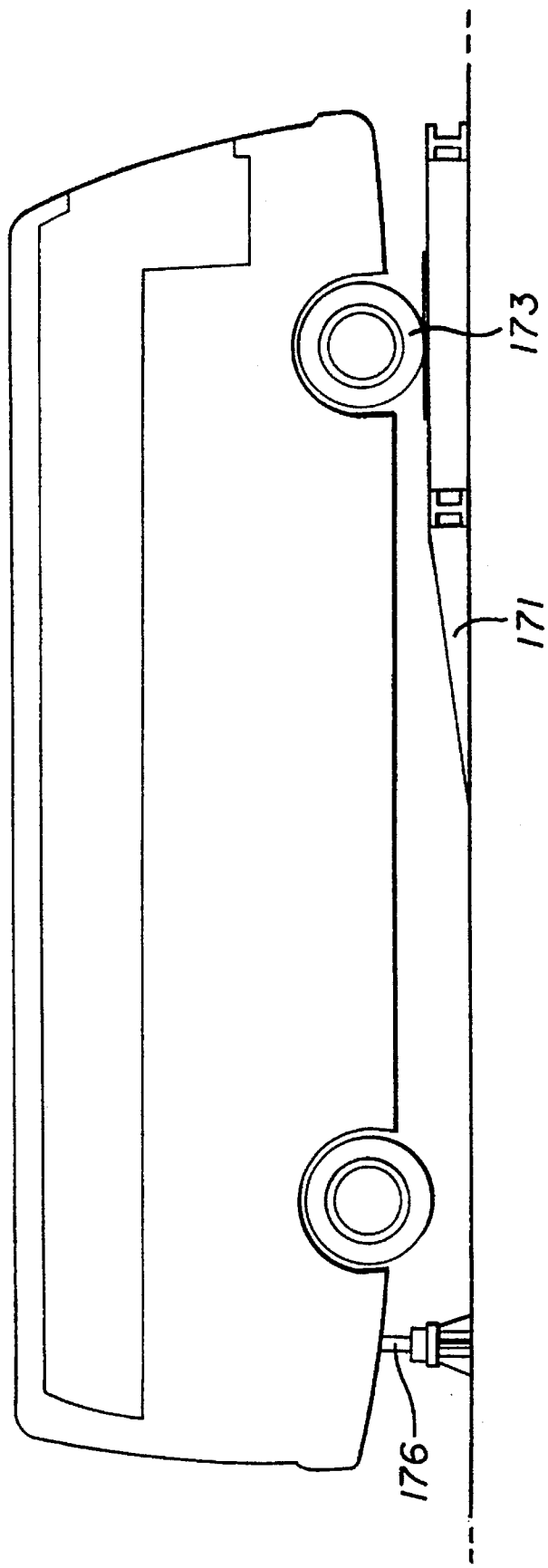
Figure 14:
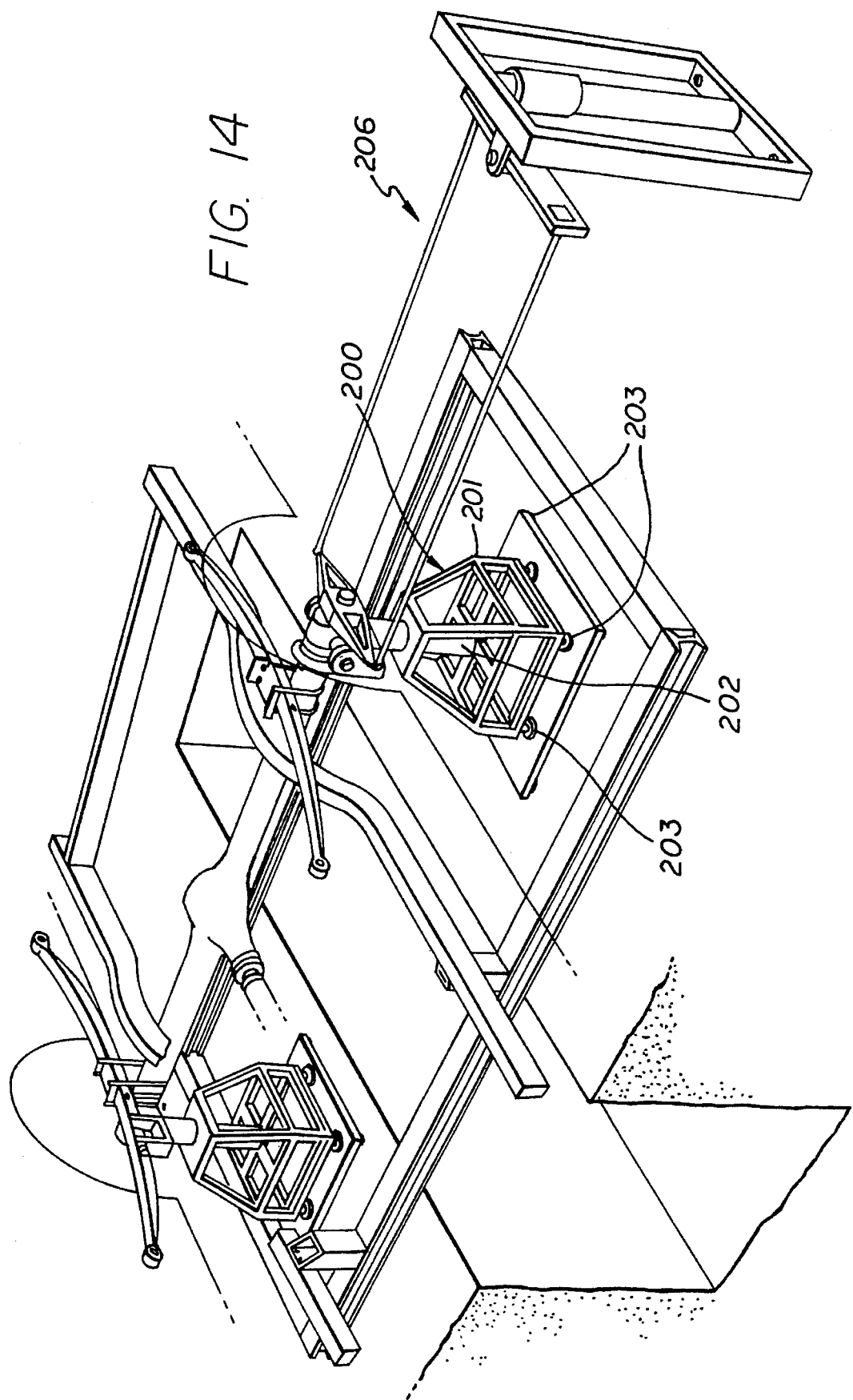

FIG. 10 shows a cutaway plan view of the support means of a preferred embodiment of the invention FIG. 11 shows transducer apparatus according to a preferred embodiment of the invention FIG. 12 shows schematically a commercial passenger vehicle arranged on the suspension testing apparatus of one embodiment of the invention FIG. 13 is an elevational view of the passenger vehicle shown in FIG. 11 supported on the vehicle suspension testing apparatus of the invention FIG. 14 shows a modification of the embodiment of FIG. 3.

Figure 1:
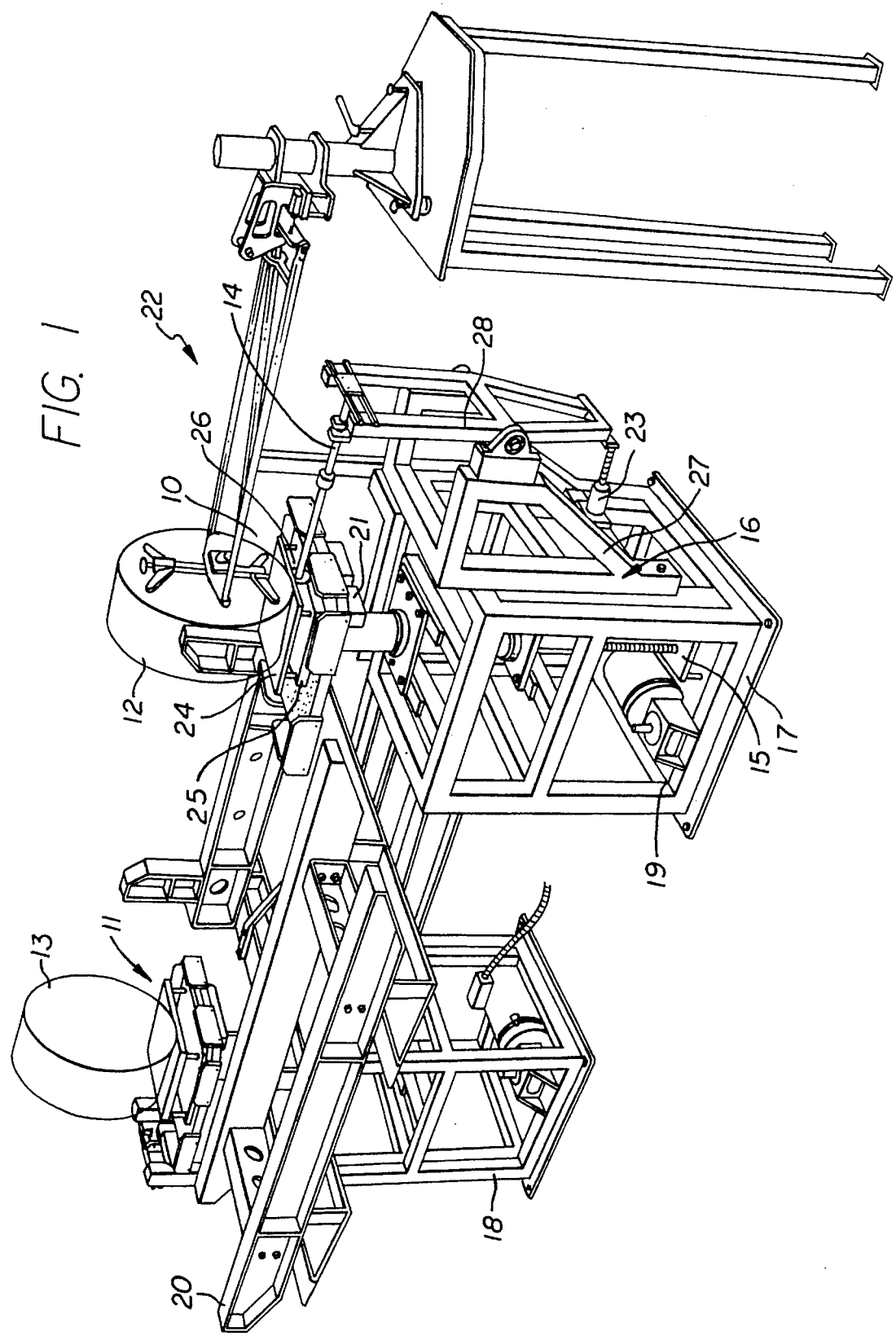
FIG. 1 shows a first embodiment of the testing apparatus of the invention

Referring to FIG. 1 a preferred embodiment of the invention can be seen to comprise the following elements; support means 10 and 11 for supporting vehicle wheels (shown schematically at 12 and 13) and actuator means provided to cause movement of the support means (two of these are shown at 23 and 15).

The support means 10 and 11 each comprise a plurality of parallel plates 24 and 25 spaced apart by spacers 26. The upper plate 24 is a wheel plate for supporting the vehicle wheel. The lower plate 25 is a bearing mounting plate. Under this plate three air bearings are attached. Examples of air bearings are described later with reference to FIGS. 6, 7 and 8. It is preferable to use three air bearings since this ensures even distribution of loading.

The support means 10 and 11 and the actuator means are located on frames 16, 17 and 18. The frame 16 is attached to the frame 17 but is releasably secured thereto so that the frame 16 can be moved relative to the frame 17 to position a force transducer in member 14 in alignment with the support means.

The actuator 15 is of the mechanical ball screw type and acts between either tile frame 17 or the surface below the frame 17 and the bottom of the support means 10. The actuator 15 is controlled by an electric motor 19.

The frame 16 is a lateral loading frame and comprises two parts 27 and 28. Part 28 is pivotally mounted on part 27. A member 14 which includes a force transducer is connected between the upper portion of the part 28 and the support means 10. A mechanical actuator 23 is connected between the frame part 27 and the frame part 28 and can be used to apply force to and/or pivot the frame part 28, thereby causing member 14 to apply a force to and/or displace the support means 10.

Similar provision is made for the wheel 13, although the components are not shown.

A locking frame 20 is provided to secure the vehicle chassis relative to the frames 18 and 17.

Various transducers are provided to measure forces on and movement of the wheels 12 and 13. The transducers for the wheel 2 can be seen. They include a vertical force transducer 21 and an arrangement 22 for measuring the wheel position. The wheel position transducer apparatus 22 will be described later in more detail with reference to a further figure.

Figure 2:
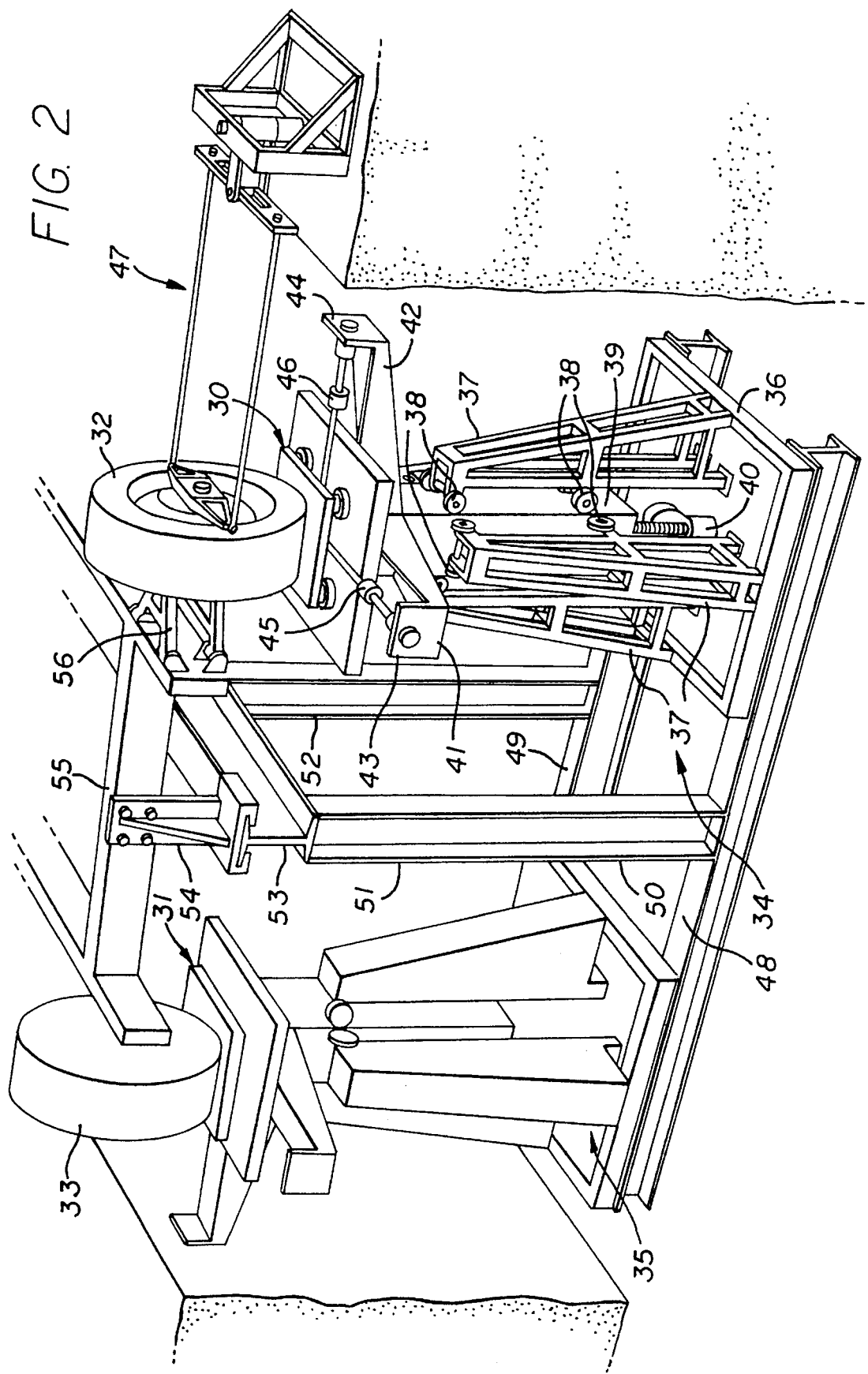
FIG. 2 shows a second embodiment of the testing apparatus of the invention

The second embodiment of the invention can be seen in FIG. 2 where wheel support means 30 and 31 are provided for the wheels 32 and 33.

In this embodiment the support means 30 and 31 are located respectively on frames 34 and 35. Frame 34 is shown in detail in the figure while frame 35 is only shown schematically. Both frames are identical to one another and therefore only frame 34 will be described in detail.

The frame 34 comprises a base member 36 on which are mounted four subframes 37. Each of the subframes has two sets of roller bearings 38. The roller bearings 38 locate in position a support member 39 which is secured to the bottom of the support means 30. A vertical actuator 40 is provided beneath the support member 39 to control the vertical position of the support member 39. The vertical actuator comprises a ball screw mechanical type actuator powered by an electric motor (not shown). The roller bearings 33 allow movement of the support member, 39 relative to the base 36 in a vertical direction only.

At the top of the support member 39 there are provided two arms 41 and 42 which are located beneath the support means 30 and which have upwardly directed flanges 43 and 44 at their ends.

Acting between the upright flanges 44 and 43 and the support means 30 are two actuators 45 and 46. Both actuators are of the mechanical ball screw type. Both actuators preferably include force transducers for measuring the applied force.

The actuator 45 can be used to apply a force on the wheel 32 in a direction along the length of the vehicle and the actuator 46 can be used to apply a force on the wheel 22 in a direction transversely of the vehicle being tested. The exact arrangement of the wheel support means 30 will be described hereafter in greater detail with reference to FIG. 4.

Transducer apparatus 47 is provided to measure the movement of the wheel 32.

The two frames 34 and 35 are both mounted on two transverse members 48 and 49. The two frames 34 and 35 can be moved relative to each other along the transverse members 45 to 49 so that the testing apparatus can be easily adjusted to test vehicles of different tracks.

Midway between the two frames 34 and 35 is provided a vertical frame 50 which comprises two upright members 51 and 52 joined by an I-beam 53. On the I-beam in provided a clasping umber 54 which can be moved along the I-beam and can be secured to the I-beam 53 so that there can be no relative motion therebetween. The clamping member 54 is adapted to be secured to a vehicle chassis such as shown at 55.

By clamping the vehicle chassis 55 to the frames 51, 34 and 35 it is ensured that the transducer apparatus 47 measures only movement of the wheel 32 relative to the vehicle chassis 55 as permitted by the suspension arrangement SE acting between the vehicle wheel and the vehicle chassis. Furthermore the clamping of the chassis 55 to the frames ensures that all forces are reacted within the frames and therefore the frames need not be secured in a substantial manner to the floor beneath them.

Whilst the drawing does not show a transducer arrangement connected to the wheel 33, such an arrangement will in fact be used and also actuators will be provided to cause motion of the wheel support means 31 in a similar fashion to the means provided for the wheel support means 30.

FIG. 3 shows a third embodiment of the invention which is simpler than the two previous embodiments and only has actuators which can apply forces longitudinally along and transversely of the vehicle. The embodiment comprises two wheel support means 60 and 61 which are mounted on top of reaction plates 62 and 63. Each reaction plate has legs 64 which allows the reaction plate to be adjusted relative to the floor beneath to ensure that the reaction plate lies in a horizontal plane.

A frame 65 is provided which comprises two transverse I-beam members 66 and 67 with two longitudinal members 68 and 69 connected therebetween. Each transverse member has two upright members 70 which each have clamping means 71 provided thereon for securing the vehicle chassis 72 so that it cannot move relative to the frame 65.

The two longitudinal members 68 and 69 respectively have upright flanges 73 and 74. A mechanical actuator 75 of the ball and screw type is provided between the upright flange 73 and the wheel support means 60 and a mechanical actuator 76 is provided between the upright flange 74 and the wheel support means 61. The actuator 76 is also of the mechanical ball and screw type. The actuators 75 and 76 can be used to apply transverse forces on the support means 60 and 61 and/or displace the support means 60 and 61 transversely.

Upright flanges 82 and 84 are provided on the transverse member 66. A mechanical actuator 83 is provided to act between the flange 82 and the support means 60 and an actuator 85 is provided to act between the flange 84 and the support means 61. The actuators 82 and 85 can be used to apply longitudinal forces on the support means 60 and 61 and/or displace the support means 60 and 61 Longitudinally.

Two frames 77 and 78 are provided transversely distanced from the frame 65 and positioned to align with the wheel 79 and 30. The frames 77 and 78 are secured to the surface below them.

In the FIG. 3 wheel transducer apparatus 81 can be seen acting between the frame 77 and the vehicle wheel 79, to enable measurement of the position of the wheel 79. This transducer apparatus will be described in more detail later on. A similar transducer apparatus will be provided between the frame 78 and the wheel 80, although it is not shown in the figure.

FIG. 4 shows an embodiment of wheel support means according to the invention. This wheel support means has been previously shown in the embodiments of FIGS. 1, 2 and 3. The wheel support means comprises wheel plate 90 which is connected to a bearing mounting plate 92 by four force transducers, two of which are seen at 94 and 95. The four force transducers can be seen with reference to the plan view shown in FIG. 5 at 91, 93, 94 and 95. The bearing mounting plate is supported on air bearings 96 which react on reaction plate 97.

Typically nine air bearings 96 are provided for each bearing plate 91. The construction of each of the air bearings 96 will be described in greater detail with reference to later figures.

Two actuators 98 and 99 are shown schematically in FIG. 4.

In FIG. 5 the actuators 99 and 98 can again be seen and the actuator 99 can be seen to comprise also a force transducer 100. A similar force transducer will be provided for the actuator 98, although this is not shown.

In FIG. 5 it can be seen that the actuators 98 and 99 act at the centre point of the vehicle wheel support means.

Figure 6:
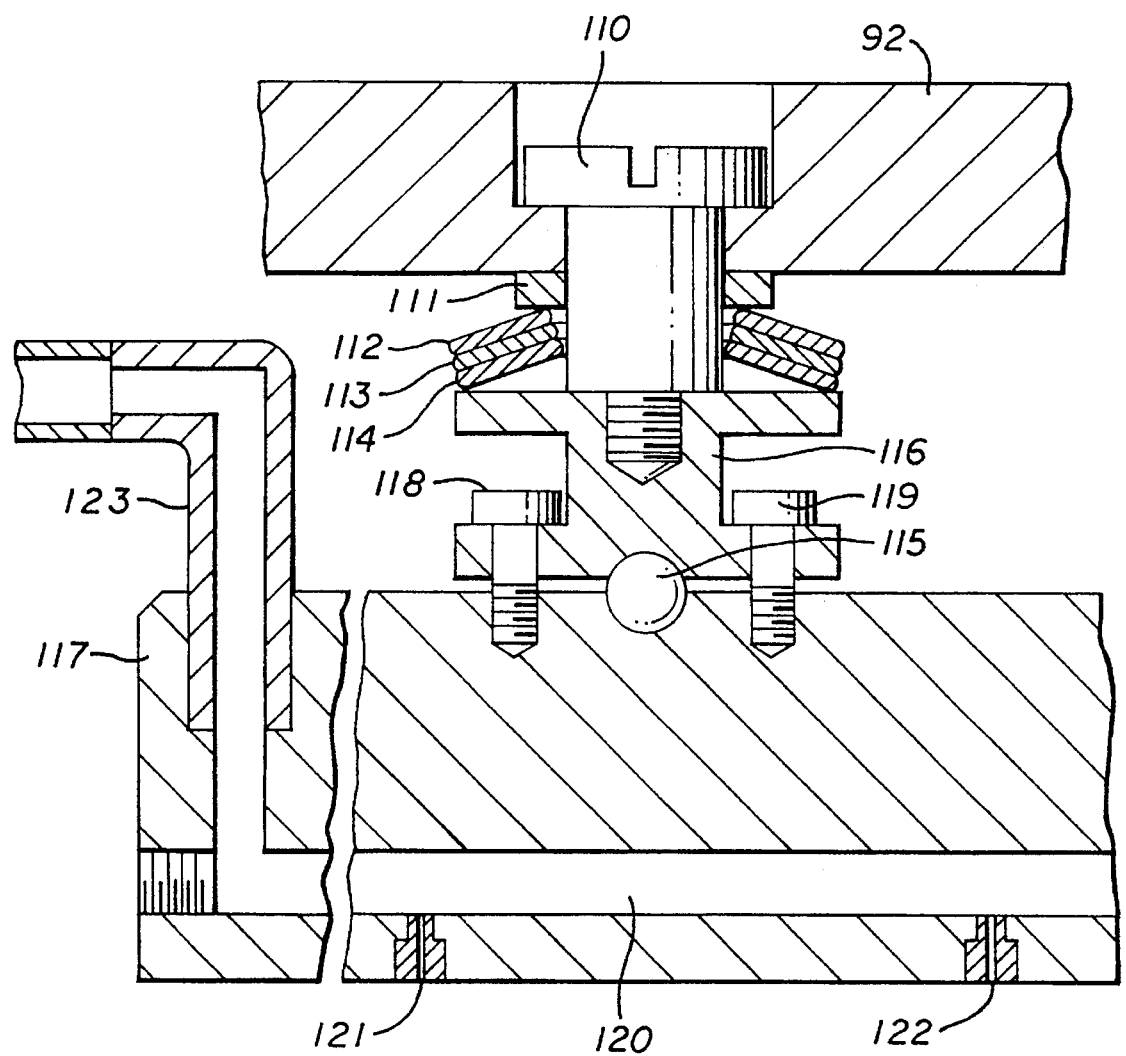
FIG. 6 shows an elevational view of part of an air bearing as used in the support means of preferred embodiments of the invention shown previously in the embodiments of FIGS. 4 and 5

FIG. 6 shows a detail of an air bearing as used in embodiments of the invention shown in FIGS. 2, 4 and 5. The air bearing comprises a locking member 110 a washer 111, a series of three belville springs 112, 112, 114 and a ball bearing 115 which allows movement between a bearing member 116 and tie air bearing plate 117.

The bearing mounting plate 92 is secured to the bearing member 116 by locking member 110. The bellville springs 112, 113 and 114 act between the bearing member 116 and the bearing mounting plate 92, via the washer 111.

Further locking members 116 and 119 are provided to limit the motion of the bearing member 116 relative to the air bearing plate 117. The ball bearing 115 allows relative motion between the bearing member 116 and the bearing plate 117.

The bearing plate 117 has running through it a series of air passages, such as shown as 120. A series of air nozzles such as 121 and 122 allow air to flow from the air passage 120 to the outside of the air bearing plate 117. An air inlet 123 is provided connected to the air passage 120.

Typically the air nozzles such as 121 and 120 are 0.2 mm in diameter and typically nine nozzles are provided for each bearing plate which is typically 150 mm$^2$.

Figure 7:
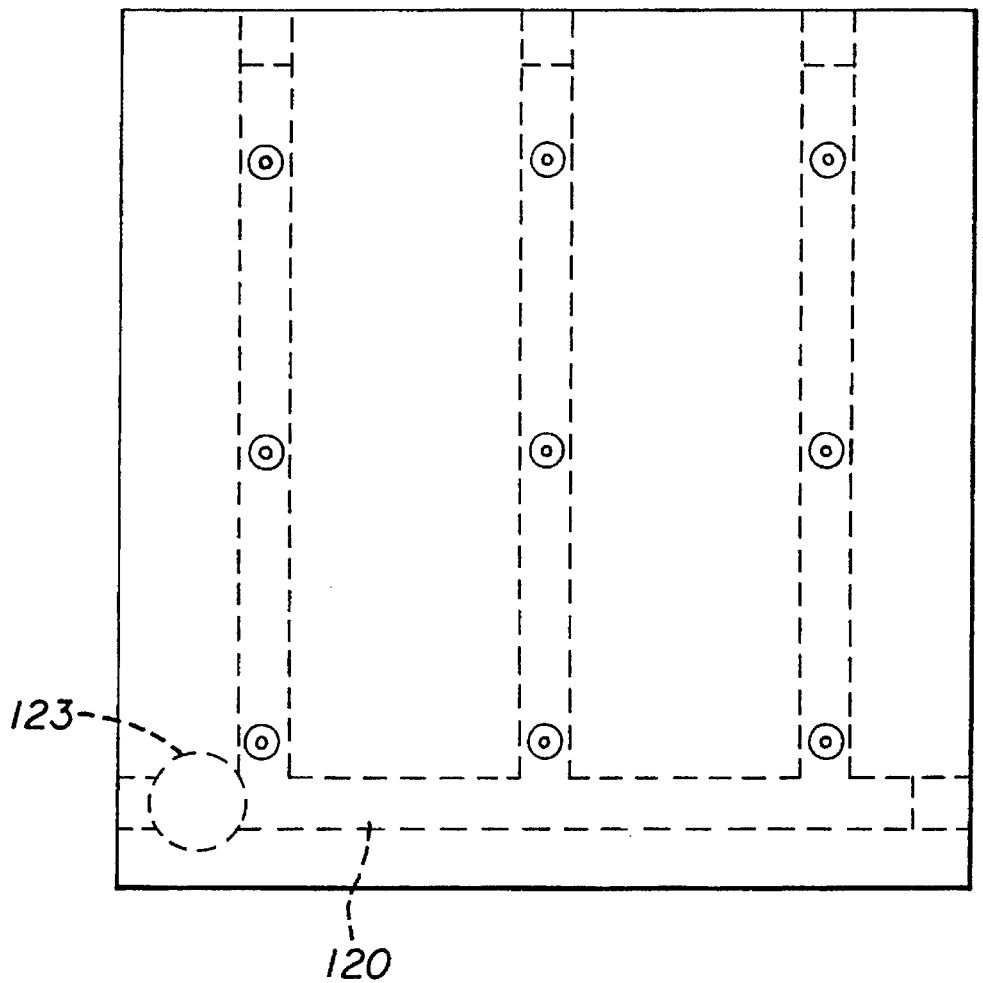
FIG. 7 shows a plan view of the air bearing of FIG. 6
Figure 8:
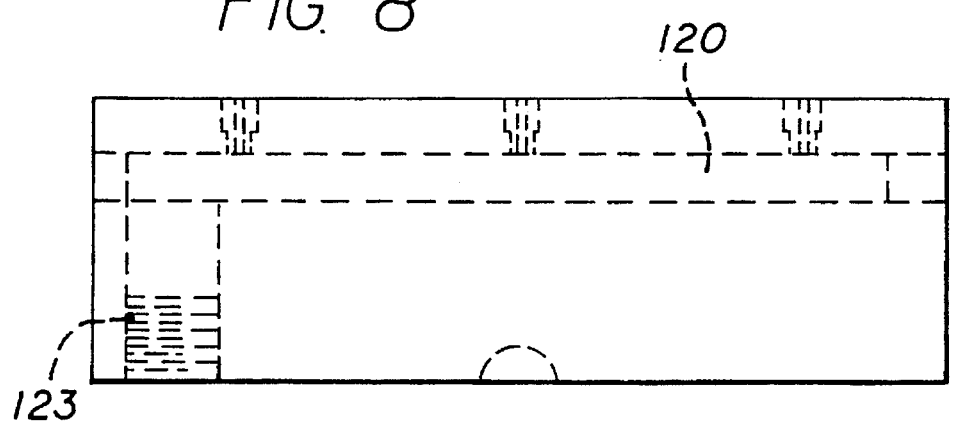
FIG. 8 shows an elevational view of the air bearing of FIG. 6.

A plan view at an air bearing plate can be seen in FIG. 7 and a third elevation view of an air bearing plate can be shown in FIG. 8.

The vehicle suspension testing apparatus of FIG. 1 can have air bearings which comprise only a bearing plate having air passages and nozzles and does not require the bellville springs or ball bearing arrangement. The vehicle suspension testing apparatus shown in FIG. 1 is adapted for lighter weight vehicles and only requires three air bearings for each support means to achieve required lift. A tripod arrangement of the three air bearings will ensure even load distribution and adequate lift between all points of the support means and the surface below. However, the embodiments of FIGS. 2 and 2 are adapted to cope with heavy vehicles and will typically have nine air bearings for each support means to ensure adequate lifting force. In such cases it is advantageous to include the bellville springs and ball bearings in the arrangement described above to allow the support means to align with the surface below it and to ensure even load distribution and adequate lift at all points.

Figure 9:
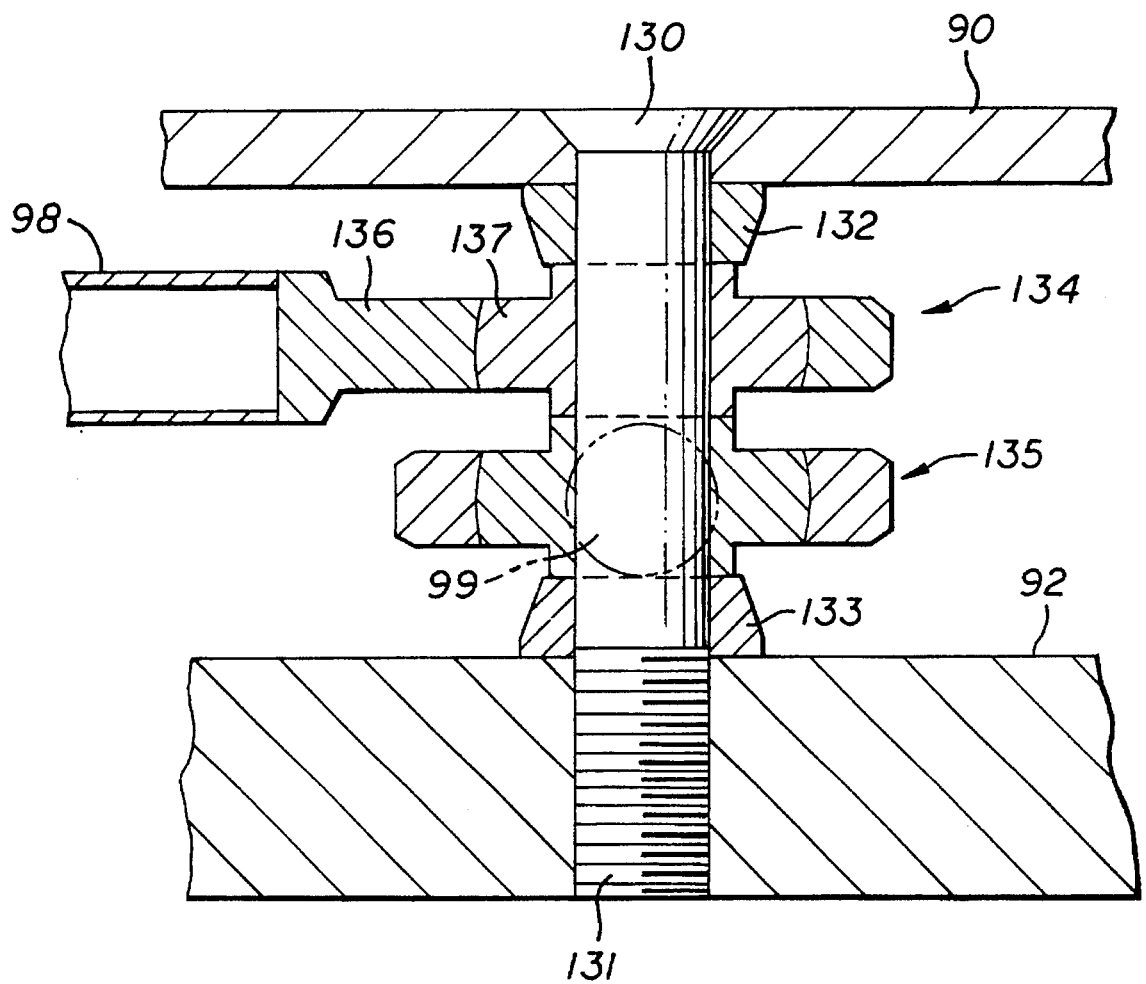
FIG. 9 shows a cross-section of an elevational view of the attachment means for attaching the actuator means to the support means in a preferred embodiment of the invention.

FIG. 9 shows how the actuators 99 and 98 are secured to the wheel plate 90 and the bearing mounting plate 92. A locking member 130 is provided with a threaded portion 131 at its lower end. The locking member 130 secures the wheel plates 90 to the bearing mounting plates 92. Sandwiched between the wheel plate 90 and the bearing plate 92 are two spacer members 132 and 133 and two rose joints 134 and 135. The two spacer members 132 and 133 are located respectively adjacent the wheel plate 90 and the bearing mounting plate 92, with the two rose joints 134 and 135 located therebetween.

The actuator 98 is connected to the rose joint 134 which itself comprises two members 136 and 137. The actuator 98 is connected to the member 136 which is located around the inner member 137. This can clearly be seen in FIG. 10 which is a cutaway view of the wheel plate 90.

The inner surface of the member 136 is rounded and matches the rounded exterior surface of the inner member 137. The matching surfaces allow pivoting of the member 136 relative to the member 137, whilst securing one member relative to the other. It is clear that the joint allows free pivoting of both wheel ptate 90 and bearino mounting plate 92 relative to the actuators 98 and 99.

Transducer apparatus according to the invention can be seen in FIG. 11. The transducer apparatus comprises a frame 140 which can be secured to the surface below it and takes the form of a square or rectangular vertical upright frame located on two feet members 142 and 143 with reinforcing diagonal members 144 and 145 acting therebetween.

A cylindrical rod member 146 extends downwardly from the top portion of the upright frame 141. A sleeve 147 is positioned on the downwardly extending rod 146 and can be secured relative to the rod by a clamping member in the form of a threaded rod extending through the sleeve 147 which is turned to engage the rod 146 by an arm 148.

Extending from the sleeve 147 are two arms 149 and 150. At the outermost ends of the arms 149 and 150 two sensor arms 151 and 152 are pivotally attached to the arms 149 and 150. Each sensor arm 151, 152 has Y-shaped portions at both ends. The Y-shaped portions of each arm have apertures running therethrough and the two arms 151 and 152 are pivotally secured to the arms 150 and 149 by locking members running through the apertures of the Y-shaped portions at first ends of the sensor arms. The Y-shaped portions at the second ends of the sensor arms 150 and 151 are rotatable relative to the Y-shaped portions at the first ends of the sensor arms about the centre lines of the sensor arms 150 and 151.

Two wishbone members 153 and 154 are pivotally attached to the ends of the sensor arms 151 and 152 such that they can pivot relative to the sensor arms in one sense only.

The wishbone members 153 and 154 are also pivotally mounted at their other ends to a wheel clamping member 155 such that the wishbones 154 and 153 can only pivot relative to the wheel clamping member 155 in one sense only.

The wheel clamping member 155 has means 158 provided thereon to enable the wheel clamping member to be secured either to the centre of a vehicle wheel or to the rim of a vehicle wheel.

A cable 156 is secured to the point of pivotal attachment to the wishbone member 154 and the wheel clamping member 155. The cable 156 is looped around a spool 157 which is pivotally mounted to the sensor arm 152 to be rotatable about an axis coincident with a pivot axis of the wishbone 153.

The sensor arms 151 152, as mentioned before, can rotate about a pivot axis running through the arms 149, 150. The rotation cit the sensor arms is sensed by sensors 160 and 161 which measure together the toe and track of the vehicle wheel.

As mentioned above, the sensor arms 151 and 152 each have one end which is rotatable relative to the other end about an axis running through the arm. Such rotation is measured by a sensor 162 which measures the vertical displacement of the wheel.

The cable 156 and the spool 157 together define part of a string potentiometer from which fore and aft movement of the wheel can be measured.

A sensor 163 is provided on the wheel clamping member 155 and this member is a gravity referenced inclinometer which measures the camber of the vehicle wheel.

A further gravity referenced inclinometer 164 is provided on the clamping means 156 and this measures the castor of the vehicle wheels.

The sensors are preferably connected to a computer system which processes the signals to display motion of the vehicle wheel on a VDU screen.

The transducer arrangement can typically provide the following measurements;

1. Vertical Displacement (Z)
2. Lateral Displacement (X)
3. Fore-Aft Displacements (Y)
4. Steer Displacement (TOE) Angle
5. Fore Canner Change
6. Wheel flotation
7. Roll Centre Height
8. Roll stiffness
9. Self-Aligning stiffness
10. Vertical Force on the Wheel
11. Lateral Force on the Wheel
12. Fore-Aft Force on the Wheel A modification of the embodiment of FIG. 3 can be seen in FIG. 14. For testing purposes the vehicle wheel is removed and a jacking assembly 200 is provided. This enables vertical movement to applied on the wheel hub.

The jacking apparatus 200 comprises a frame 201 wich supports a vertical jacking actuator 202. The top of the vertical jacking actuator is connected to a gimble mounting assembly which is adapted to be connected to the wheel hub. The gimble assembly allows 25° of axle articulation.

The frame 201 is provided at its lower end with air bearings 203, as previously described. Transducer apparatus 206 is provided to measure the movement of the wheel hub under loading.

Preferably the actuator 202 is a precision ground linear ball screw actuator powered by a variable speed DC motor. This enables simple and cheap actuation with a high degree of accuracy and the ability to measure displacment directly from the actuator.

Use of the apparatus previously described and a method of testing vehicle suspension system will now be discussed with reference to FIGS. 12 and 13.

A commercial passenger vehicle 170 is driven up ramps 171 and 172 such that one of the vehicle wheels 173 is located on suspension testing apparatus according to the invention. Although in FIG. 11 only one wheel is located on suspension tasting apparatus, it is envisaged that both vehicle wheels 173 and 174 could at the same time be located on suspension testing apparatus and this will be clearly seen from the earlier figures of the application in which testing apparatus is provided in parallel for two wheels. The wheel 173 is located centrally on the wheel support means 175. It is envisaged that the wheel plate of the wheel support means will have marked thereon a locating spot for the vehicle wheel which would typically DC a square on the top of the wheel plate. The wheel is located such that the centre of the hub lies centrally in the plate or such that the centre of the of hub is distant slightly forward (in the sense of vehicle motion) of the centre of the plate, to allow for "pneumatic trail".

When the vehicle is in motion, the actual point on the tyre through which force is transmitted to the vehicle road does not lie directly beneath the wheel hub, due to the deformation of the tyre under rolling motion. Instead, when a vehicle is moving forward, the force is transmitted at a point behind the centre of the vehicle hub at a distance which is defined as the "pneumatic trail" of the tyre. The pneumatic trail for a particular tyre is evaluated by vehicle tyre manufacturers and is supplied with technical details for the tyre.

Since it is important to measure characteristics of a suspension in use, it is preferable to locate the wheel on the plate such that pneumatic trail is taken into account.

The wheel 173 can be located by simply measuring the position of the wheel 173 from the edges of the wheel plate.

Once the vehicle 170 is located on the suspension testing apparatus 175 the vehicle 170 is secured relative to the testing apparatus by clamping the vehicle chassis to the frame of the vehicle testing apparatus.

The vehicle 170 is preferably bolted to the test rig frame at its normal ride height, so that the force in the wheel plates is representative of normal reaction of the wheel.

By securing the front section of the vehicle to the test rig framework, the forces generated during a test are reacted within the test rig structure and this eliminates the need for a strong floor installation.

Once the vehicle body 170 has been secured then loads are applied to the vehicle wheel 173 by the actuators of the suspension testing apparatus. For instance, if apparatus according to FIG. 3 is used then the mechanical ball screw actuator 83 would be used to apply a force longitudinally of the vehicle, the mechanical ball screw actuator 75 would be used to apply a force laterally of the vehicle.

The actuators used are preferably precision ground linear ball screw mechanisms which are powered by variable speed high performance electric motors. The arrangement allows a quiet reliable low maintenance means of controlling load applications.

The air bearing plate of the wheel support means will in use be connected to a supply of pressurised air, typically at 90 psi.

The air bearing arrangement permits low noise movement of the wheel plate with negligible friction. The air bearings generate considerably less friction than mechanical bearings and this is a crucial factor to the accuracy of a suspension test rig, particularly when large commercial vehicles are used of considerable weight, since obviously the friction generated is proportional to the force on the wheel support means.

It is important to ensure that the wheel plate lies in a horizontal plane when in use and to enable this the air bearings comprise the spring and ball bearing arrangements previously discussed. Each spring allows a small amount of vertical motion, while the ball seat allows the wheel plate to align against the reaction plate. Such deformation and alignment ensures that the wheel plate remains in a plane parallel to the plane surface below and ensures that the load is transmitted equally through all of the air bearings.

The lift of the air plate when the pump is working varies between 0.05 and 0.08 mm. It is important to provide the springs and bearings to allow alignment of the air plate with its reaction surface, since it is very difficult to machine a plate uniformly flat over its surface and therefore there needs to be the facility for some adjustment to account for undulations in the surface of the plate.

The system will automatically allow the plate to align itself with its reaction surface to ensure that there is lift between both.

Various tests can be carried out on the suspension. For instance, the characteristics of the suspension under braking can be determined by locking the wheel tested and applying a force longitudinally along the vehicle using an actuator such as 83.

Transducer apparatus such as previously described will be connected to the wheel 173 and will measure the displacement of the wheel 173 when the force is applied thereto to record the linear translation and rotation of the wheel. The measurement of the transducers can then be used to evaluate the suspension kinomatic and compliance deflection characteristics.

When initially attaching the transducer apparatus to the wheel it is preferable to ensure that the four corner angles of the apparatus, i.e. the angles between the wishbone members and the sensor arms and the wheel mounting member, are all 90°.

As well as the forces and the deflections noted by the transducer apparatus, the force transducers between the wheel plate and the bearing plate of the wheel support means of FIGS. 2, 3, 4 and 5 or the earce transducer 21 of FIG. 1 also note the vertical tarce on the wheel.

The use of four force transducers in the apparatus of FIGS. 2, 3, 4 and S between the wheel plate and the cearing plate ensures that the force transducers together always weigh the net vertical force on the wheel plate.

As mentioned above, the ball and screw actuators used give a direct measurement of displacement of the support means.

The construction of the preferred embodiment of the invention ensures that both lateral and longitudinal forces are applied to the centre of the wheel plate of the support means, whilst allowing free rotation of the plate, thereby allowing free movement of the wheel when the force is applied. It is very important to apply forces at the centre of the wheel plate since this ensures that the point of application of the force does not change with wheel rotation. If the point of application or force changes during wheel rotation then this has to be taken into account when calculating the vehicle suspension deflection characteristics under loading, since, for instance, a lateral force can apply a rotational couple on the wheel it the point of appitcation of the force is away from the pivot axis of the rotation. This can easily happen, for instance, if the actuator acts on the exterior of the wheel plate rather than acting at the centre of the wheel plate.

As mentioned above, it may not be desirable to locate the centre of the wheel hub directly above the centre of the plate, since the tester may wish take into account pneumatic trail, which has been discussed above. This pneumatic trail can be typically be in the range of 40 to 55 mm and the wheel can be accordingly offset from the centre of the plate, to ensure that force is applied to wheel at the point in the tyre through which load is usually transmitted.

With apparatus as shown In FIGS. 1 and 2, vertical force can be applied on the vehicle wheel and this is a more sophisticated system than the system of FIG. 3 which can only apply lateral and longitudinal forces or the vehicle wheel However, the arrangement of FIG. 14 could be used subsequently to the arrangement of FIG. 3, to allow testing of a suspension under vertical loading.

To mimick exactly the motion of a wheel on braking it may be desirable to increase the vertical reaction on the wheel to account for the transfer of weight between the wheels at the vehicle on braking. This is possible with the embodiments of FIG. 1 and 2.

As mentioned above, the actuators are preferably precision ground linear ball screw mechanisms powered by variable speed electric motors. The displacement of the actuators can be controlled by a computer to simulate forces on the wheel during braking. These linear ball screws are generally very accurate and are for instance accurate to 0.5 mm over 300 mm extension. They also enable the easy measurement of displacement, since the revolutions of the ball screw can be counted to determine displacement.

As can be seen in the FIGS. 10 and 11 the rear wheels of the vehicle are preferably jacked up using standard jacking equipment. The working surface of the wheel plate will typically be 350 mm above the ground plane and the rear of the vehicle will be raised accordingly.

In a preferred embodiment an additional transducer can be provided to measure chassis deflection relative to the frame of the suspension testing apparatus during the loading. Obviously, it is desirable to measure only the movement of the wheel relative to the chassis and not the movement of the chassis relative to its surroundings. By measuring chassis deflection it is possible to subtract any such deflection from the recorded deflection of the wheel to arrive at an accurate measurement of the load/deflection characteristic of the suspension arrangement.

The apparatus of FIGS. 1, 2 and 14 is adapted a measure "bump steer". When a vehicle is travelling around a corner and encounters a bump then the steering angle of the wheel can vary with the bump. The apparatus can be used to measure change in steer angle with suspension movement for roughly 50 mm of movement, so that kinematics of the linkage can be determined.

Obviously the apparatus shown in FIGS. 1 and 2 can be used for bump steer measurement, since they incorporate vertically acting actuators. The embodiment of FIG. 14 is intended as an additional feature of the simplified apparatus of FIG. 3, which does not normally possess a vertical actuator.

When conducting bump steer tests on large vehicles with leaf springs it may be necessary to remove several leafs from the leaf spring assembly to leave a single leaf.

The use of a single leaf will enable determination of deflection characteristics of the suspension during loading enabling use of a standard actuator, which would have difficulty in supplying sufficient force to a multi-leaf suspension arrangement.

The arrangements of FIGS. 3 and 12 can be used on a standard workshop floor with the minimum of installation requirement, although an inspection pit can be advantageous.

Whilst in FIGS. 12 and 13 the vehicle suspension apparatus is shown in use tasting a commercial passenger vehicle the apparatus and method of the invention can be used to test any vehicle of any size haivng a suspension system.

To conclude, the invention provides in one aspect a suspension testing apparatus which is very accurate since it uses air bearings which have a very low coefficient of friction which is typically five times less than the coefficient of friction of mechanical bearings. This is especially important when the suspension systems of large vehicles are being tested, especially since the weight of the large vehicles can lead to considerable frictional forces.

The invention provides in a second aspect suspension testing apparatus which ensures accurate measurement of suspension characteristics since the apparatus applies forces directly below the centre of the vehicle wheel hub (or forwardly or rearwardly therefrom at a distance equivalent to the pneumatic trail of the tyre in the wheel) to ensure that the point of application of a farce remains constant despite rotation of the support means for the wheel during deflection of the vehicle wheel. Otherwise the longitudinal and transverse actuators can apply rotational forces on the vehicle wheel, leading to inaccuracies in measurement or leading to complications in the computing of accurate suspension characteristics.

The invention in a third aspect provides new sensor means for measuring the vehicle wheel deflection which uses a minimum number of transducers to accurately monitor tyre and wheel deflection during use.

The invention provides in a fourth aspect testing apparatus which uses mechanical actuators rather than hydraulic actuators to cause motion of the support means, which give an indication of the displacement of the support means. Such actuators are cheap, simple and precise. They are also inherently safe since they remain in position until movement is required.

In a sixth aspect the invention provides a method of testing a vehicle suspension using the apparatus of the invention.

I claim:

1. Vehicle suspension testing apparatus comprising:

wheel support means for supporting thereon a vehicle wheel, actuator means for applying force to the wheel support mean in at least two directions selected from the group of directions vertical to, transverse to, and longitudinally along the vehicle, and sensor means for measuring the displacement of the vehicle wheel, wherein the actuator means is connected to the wheel support means by pivotal connection means directly below the center of the vehicle wheel, said pivotal connection means allowing free pivotal motion of the wheel support means in at least one plane.

2. Vehicle suspension testing apparatus as claimed in claim 1 wherein the wheel support means comprises air bearing means which in use raises the wheel support means above the surface therebelow and wherein the wheel hub support means has a flat lower exterior surface and the air bearings means comprises a plurality of air bearings attached to the flat lower exterior surface of the wheel support means by attachment means which allows limited motion of the air bearings relative to the flat lower exterior surface of the wheel support means and which comprises spring means acting between the said flat lower exterior surface of the wheel support means and the air bearings.

3. Vehicle suspension testing apparatus as claimed in claim 1 wherein the wheel support means comprises a wheel plate for receiving thereon a vehicle wheel, the connection means is connected to the wheel support means directly underneath the center of the wheel plate and the free pivotal motion allowed by the connection means allows the wheel plate to rotate in the plane thereof.

4. Vehicle suspension testing apparatus as claimed in claim 1
wherein the sensor means comprises a frame fixed relative to the wheel, and a wishbone arrangement comprising first and second spaced apart arms each pivotally attached to both the frame and wheel clamp member attachable to the vehicle wheel, rotation sensors being provided to measure pivoting of the first and second spaced apart arms relative to the frame and inclinometers being provided on the wheel clamp member to measure inclination thereof.

5. Vehicle suspension testing apparatus as claimed in claim 1
wherein the actuator means comprises a first mechanical actuator for moving the wheel support means in a direction longitudinally along the vehicle and a second mechanical actuator for moving the wheel support means transversely of the vehicle, which first and second mechanical actuators are respectively adapted to provide indications of the longitudinal and transverse displacements of the wheel support means.

6. Vehicle suspension testing apparatus as claimed in claim 5 wherein the actuator means comprises additionally third mechanical actuator for moving the wheel support means vertically, which third mechanical actuator is adapted to provide and indication of the vertical displacement of the wheel support means.

7. Vehicle suspension testing apparatus as claimed in claim 5 wherein the mechanical actuators are all ball and screw type actuators.

8. Vehicle suspension testing apparatus as claimed in claim 7 where the ball and screw type actuators are coupled to and are driven by electric motors.

9. A method of testing a vehicle suspension system of a vehicle including the steps of:
locating a wheel of the vehicle on the wheel support means of vehicle suspension testing apparatus claimed in claim 1,
attaching the sensor means to the vehicle wheel,
applying a force to the wheel support means using the actuator means,
measuring force on the vehicle wheel using the sensor means.

10. Vehicle suspension testing apparatus as claimed in claim 1 comprising additionally a frame on which are mounted the wheel support means and the actuator means, said actuator means acting between the frame and the wheel support means, said frame having a clamping means for securing the frame to the body of the vehicle being tested.

11. Vehicle suspension testing apparatus as claimed in claim 1 wherein the actuator means can apply a force on the wheel longitudinally and transversely of the vehicle.

12. Vehicle suspension testing apparatus as claimed in claim 11 wherein the actuator means can also apply a vertical forces on the wheel.

13. Vehicle suspension testing apparatus as claimed in claim 1 wherein the wheel support means comprises a wheel plate for receiving thereon a vehicle wheel and a bearing mounting plate located parallel to and vertically spaced below the wheel plate to which air bearings are attached, the actuator means extending between the wheel plate and the bearing mounting plate to attachment means which attaches the actuator means to the wheel plate and the bearing mounting plate respectively below and above the centers of the plates, the attachment means allowing pivotal motion of the plates, while restraining translational motion.

14. Vehicle suspension testing apparatus comprising:
wheel support means for supporting thereon a vehicle wheel,
actuator means for displacing the wheel support means, and
sensor means for measuring the displacement of the vehicle wheel,
wherein the actuator means is connected to the wheel support means by pivotal connection means directly below the center of the wheel, said pivotal connection means allowing free pivotal motion of the wheel support means in at least one plane.

15. Vehicle suspension testing apparatus as claimed in claim 14
wherein the wheel support means comprises air bearing means which in use raises the wheel support means above the surface therebelow, and wherein the wheel hub support means has a flat lower exterior surface and the air bearings means comprises a plurality of air bearings attached to the flat lower exterior surface of the wheel support means by attachment means wich allows limited motion of the air bearings relative to the flat lower exterior surface of the wheel support means and which comprises spring means acting between the said flat lower exterior surface of the wheel support means and the air bearings.

16. Vehicle suspension testing apparatus as claimed in claim 14
wherein the actuator means comprises a first mechanical actuator for moving the vehicle wheel hub support means in a direction longitudinally along the vehicle and a second mechanical actuator for moving the vehicle wheel hub support means transversely of the vehicle, which first and second mechanical actuators are respectively adapted to provide indications of the longitudinal and transverse displacements of the vehicle wheel hub support means.

17. Vehicle suspension testing apparatus as claimed in claim 16 wherein the actuator means comprises additionally a third mechanical actuator for moving the vehicle wheel hub support means vertically.

18. Vehicle suspension testing apparatus comprising:
wheel support means for supporting thereon a vehicle wheel, having an axis of rotation and a tire thereon with a pneumatic trail,
actuator means for displacing the wheel support means, and
sensor means for measuring the displacement of the vehicle wheel,
wherein the actuator means is connected to the wheel support means by below the vehicle wheel by pivotal connection means at a point on the wheel support means spaced from a plane containing the axis of rotation of the wheel by a distance corresponding to the pneumatic trail of the tire on the vehicle wheel, said pivotal connection means allowing free pivotal motion of the wheel support means in at least one plane.

19. Vehicle suspension testing apparatus as claimed in claim 18 wherein the wheel hub support means comprises air bearing means which in use raises the wheel hub support means above the surface therebelow, and the wheel hub support means has a flat lower exterior surface and the air bearings means comprises a plurality of air bearings attached to the flat lower exterior surface of the wheel hub support means by attachment means which allows limited motion of the air bearings relative to the flat lower exterior surface of the wheel hub support means and which comprises spring means acting between the said flat lower exterior surface of the wheel hub support means and the air bearings.

20. Vehicle suspension testing apparatus as claimed in claim 18 wherein the sensor means comprises a frame fixed relative to the vehicle wheel hub and a wishbone arrangement for comprising first and second vertical spaced arms each pivotally attached to both the frame and wheel clamp member for attached to the vehicle wheel hub, rotation sensors being provided to measure pivoting of the first and second spaced apart arms relative to the frame and inclinometers being provided on the wheel clamp member to measure inclination thereof.

21. Vehicle suspension testing apparatus as claimed in claim 18 wherein the actuator means comprises a first mechanical actuator for moving the wheel support means in a direction longitudinally along the vehicle and a second mechanical actuator for moving the wheel support means transversely of the vehicle, which first and second mechanical actuators are respectively adapted to provide indications of the longitudinal and transverse displacements of the wheel support means.

22. Vehicle suspension testing apparatus as claimed in claim 21 wherein the actuator means comprises additionally a third mechanical actuator for moving the wheel support means vertically.

23. Vehicle suspension testing apparatus comprising:

wheel support means for supporting thereon a vehicle wheel hub, actuator means for applying force to the wheel hub support means, and sensor means for measuring the force on the vehicle wheel hub, wherein the actuator means is connected to the wheel support means by pivotal connection means directly below the center of the vehicle wheel hub, said pivotal connection means allowing free pivotal motion of the wheel support means.

24. Vehicle suspension testing apparatus as claimed in claim 23, wherein the wheel hub support means comprises air bearing means which in use raises the wheel hub support means above the surface therebelow, and the wheel hub support means has a flat lower exterior surface and the air bearings means comprises a plurality of air bearings attached to the flat lower exterior surface of the wheel hub support means by attachment means which allows limited motion of the air bearings relative to the flat lower exterior surface of the wheel hub support means and which comprises spring means acting between the said flat lower exterior surface of the wheel hub support means and the air bearings.

25. Vehicle suspension testing apparatus as claimed in claim 23 wherein the sensor means comprises a frame fixed relative to the vehicle wheel hub and a wishbone arrangement comprising first and second vertical spaced arms each pivotally attached to both the frame and wheel clamp member for attachable to the vehicle wheel hub, rotation sensors being provided to measure pivot of the first and second vertical spaced arms relative to the frame and inclinometers being provided on the wheel clamp member to measure inclination thereof.

26. Vehicle suspension testing apparatus as claimed in claim 23 wherein the actuator means comprises a first mechanical actuator for moving the vehicle wheel hub support means in a direction longitudinally along the vehicle and a second mechanical actuator for moving the vehicle wheel hub support means transversely of the vehicle, which first and second mechanical actuators are respectively adapted to provide indications of the longitudinal and transverse displacements of the vehicle wheel hub support means.

27. Vehicle suspension testing apparatus as claimed in claim 26 wherein the actuator means comprises additionally a third mechanical actuator for moving the vehicle wheel hub support means vertically.

28. Vehicle suspension testing apparatus comprising:

wheel hub support means for supporting thereon a vehicle wheel hub, actuator means for displacing the wheel hub support means, and sensor means for measuring displacement of the vehicle wheel hub, wherein the actuator means is connected to the wheel support means by pivotal connection means directly below the center of the wheel hub, said pivotal connection means allowing free pivotal motion of the wheel support means in at least one plane.

29. Vehicle suspension testing apparatus as claimed in claim 28 wherein the sensor means comprises a frame fixed relative to the vehicle wheel and a wishbone arrangement comprising first and second spaced arms each pivotally attached to both the frame and wheel clamp member for attachable to the vehicle wheel, rotation sensors being provided to measure pivot of the first and second vertical spaced arms relative to the frame and inclinometers being provided on the wheel clamp member to measure inclination thereof.

30. Vehicle suspension testing apparatus comprising:

wheel support means for supporting thereon a vehicle wheel having an axis of rotation and a tire thereon with a pneumatic trail, actuator means for supplying a force to the wheel support means, and sensor means for measuring the force on the vehicle wheel, wherein the actuator means is connected to the wheel support means below the vehicle wheel by connector means at a point wheel support means spaced from a plane containing the axis of the rotation of the wheel by a distance corresponding to the pneumatic trail of the tire of the wheel, said connection means allowing free pivotal motion of the wheel support means in at least one plane.

* * * * *

UNITED STATES PATENT AND TRADEMARK OFFICE
CERTIFICATE OF CORRECTION

PATENT NO. : 5,569,836
DATED : Oct. 29, 1996
INVENTOR(S) : Raymond L. Hill

It is certified that error appears in the above-indentified patent and that said Letters Patent is hereby corrected as shown below:

Column 8, Line 42, Change "Canner", To Read --Camber--.

Column 8, Line 43, Change "flotation", To Read --Rotation--.

Column 12, Claim 1, Line 53, Change "displacement of", To Read --force on--.

Signed and Sealed this

Sixth Day of May, 1997

*Attest:*

*Attesting Officer*

BRUCE LEHMAN

*Commissioner of Patents and Trademarks*